(12) United States Patent
Nakajima

(10) Patent No.: US 11,597,336 B2
(45) Date of Patent: Mar. 7, 2023

(54) HEAT SHIELD STRUCTURE FOR SUPERCHARGER

(71) Applicant: TOYOTA JIDOSHA KABUSHIKI KAISHA, Toyota (JP)

(72) Inventor: Takahiro Nakajima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/464,030

(22) Filed: Sep. 1, 2021

(65) Prior Publication Data

US 2022/0153209 A1 May 19, 2022

(30) Foreign Application Priority Data

Nov. 16, 2020 (JP) .............................. JP2020-190404

(51) Int. Cl.
*B60R 13/08* (2006.01)

(52) U.S. Cl.
CPC ................................ *B60R 13/0838* (2013.01)

(58) Field of Classification Search
CPC . B60R 13/0838; B60R 13/08; B60R 13/0823; B60R 2021/2607

USPC ...................................................... 123/198 E
See application file for complete search history.

(56) References Cited

U.S. PATENT DOCUMENTS

| 4,610,326 A | * | 9/1986 | Kirchweger | ........ B60R 13/0838 181/204 |
| 2020/0398769 A1 | * | 12/2020 | Takeda | ................... B62D 25/14 |

FOREIGN PATENT DOCUMENTS

JP 2019-100224 A 6/2019

* cited by examiner

*Primary Examiner* — Yi-Kai Wang
(74) *Attorney, Agent, or Firm* — Oliff PLC

(57) ABSTRACT

A vehicle includes an internal combustion engine, a supercharger placed behind an internal combustion engine, and a first insulator and a second insulator covering the supercharger. The first insulator is provided between the internal combustion engine and the supercharger and covers the supercharger from its front side. The second insulator covers the supercharger from its upper side, its rear side, and its lower side. An upper edge of the first insulator and an upper edge of the second insulator are positioned above and ahead of the supercharger and define a first opening. The first opening faces forward when the first opening is viewed from an inner region surrounded by the first insulator and the second insulator.

7 Claims, 3 Drawing Sheets

HEAT SHIELD STRUCTURE FOR SUPERCHARGER

CROSS-REFERENCE TO RELATED APPLICATION

This application claims priority to Japanese Patent Application No. 2020-190404 filed on Nov. 16, 2020, incorporated herein by reference in its entirety.

BACKGROUND

1. Technical Field

The present disclosure relates to a heat shield structure for a supercharger.

2. Description of Related Art

A vehicle described in Japanese Unexamined Patent Application Publication No. 2019-100224 (JP 2019-100224 A) includes an internal combustion engine and a supercharger. The internal combustion engine and the supercharger are positioned in an engine room. The supercharger is positioned behind the internal combustion engine. Further, the vehicle includes an insulator covering the supercharger. The insulator covers the supercharger from its upper side and its rear side. The insulator has an opening. The opening is positioned behind the supercharger.

SUMMARY

In the vehicle described in JP 2019-100224 A, during traveling of the vehicle, travel wind generally flows rearward from the front side in the front-rear direction of the vehicle in the engine room. However, the opening of the insulator in JP 2019-100224 A faces rearward in the front-rear direction of the vehicle when the opening is viewed from the supercharger, and therefore, the travel wind is hard to be introduced into the insulator. Accordingly, the travel wind is hard to hit the supercharger. Thus, there is room for improvement in cooling performance for the supercharger.

In order to achieve the above object, the present disclosure is to provide a heat shield structure for a supercharger, the heat shield structure being applied to a vehicle including an internal combustion engine, a supercharger placed behind the internal combustion engine, and an insulator covering the supercharger. The insulator is provided between the internal combustion engine and the supercharger such that the insulator covers the supercharger from a front side of the supercharger and also covers the supercharger from an upper side, a rear side, and a lower side of the supercharger. The insulator has an opening at a position above and ahead of the supercharger. The opening faces forward when the opening is viewed from an inner region surrounded by the insulator.

In the above configuration, since the opening is opened forward in the front-rear direction of the vehicle, travel wind flowing rearward from the front side in the front-rear direction of the vehicle easily flows into the inner region surrounded by the insulator. Accordingly, much travel wind can be guided to the supercharger, so that the supercharger can be cooled effectively.

In the above configuration, when the opening is taken as a first opening, the insulator may have a second opening at a position behind the first opening and above the supercharger, and the second opening may face upward when the second opening is viewed from the inner region.

In the above configuration, the second opening faces upward. Accordingly, the travel wind flowing along an upper surface of the insulator can be easily introduced into the inner region inside the insulator.

In the above configuration, the heat shield structure may include a wall portion above the insulator. The wall portion may face forward, and the second opening may be positioned right under the wall portion.

In the above configuration, the travel wind flowing rearward from the front side partially hits the wall portion and flows downward. Accordingly, the travel wind easily flows into the inner region inside the insulator through the second opening positioned right under the wall portion.

In the above configuration, when the opening is taken as a first opening, the insulator may have a third opening at a position behind and below the supercharger, and the third opening may face downward when the third opening is viewed from the inner region.

In the above configuration, the travel wind introduced through the first opening and passing between the insulator and the supercharger passes through the third opening and is discharged outside from the inner region inside the insulator. This accordingly restrains the travel wind flowing through the inner region inside the insulator from staying therein and contributes to effective cooling of the supercharger.

In the above configuration, the insulator may include a projection portion projecting toward the supercharger, and the projection portion may be positioned below the opening and ahead of the supercharger. In the above configuration, the travel wind introduced through the opening is guided to the supercharger by the projection portion. Accordingly, the supercharger is easily cooled by the travel wind.

In the above configuration, when a surface facing upward among surfaces of the projection portion is taken as a first surface, the insulator may include a second surface facing the first surface. A difference between a shortest distance and a longest distance from the first surface to the second surface in a direction perpendicular to the first surface may be equal to or less than 20% of the shortest distance.

In the above configuration, the distance from the first surface to the second surface does not suddenly change. On this account, the flow of the travel wind passing through the opening and flowing between the first surface and the second surfaces is stable. Accordingly, it is possible to restrain occurrence of turbulence around the opening and to restrain such a situation that the travel wind is hard to flow into the inner region inside the insulator due to the turbulence.

In the above configuration, the insulator may include a first insulator covering the front side of the supercharger, and a second insulator covering the upper side, the rear side, and the lower side of the supercharger, and the opening may be defined by an edge of the first insulator and an edge of the second insulator.

In the above configuration, since the opening is formed by the edge of the first insulator and the edge of the second insulator, it is not necessary to form the opening by drilling or the like, so that it is possible to restrain an increase in manufacture man-hours.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Schematic Configuration

The following describes a schematic configuration of a vehicle front portion. Note that, in the following description, a virtual axis extending in the front-rear direction of a vehicle V is referred to as a front-rear axis, a virtual axis extending in the right-left direction of the vehicle V is referred to as a right-left axis, and a virtual axis extending in the up-down direction of the vehicle V is referred to as an up-down axis.

Figure 1:
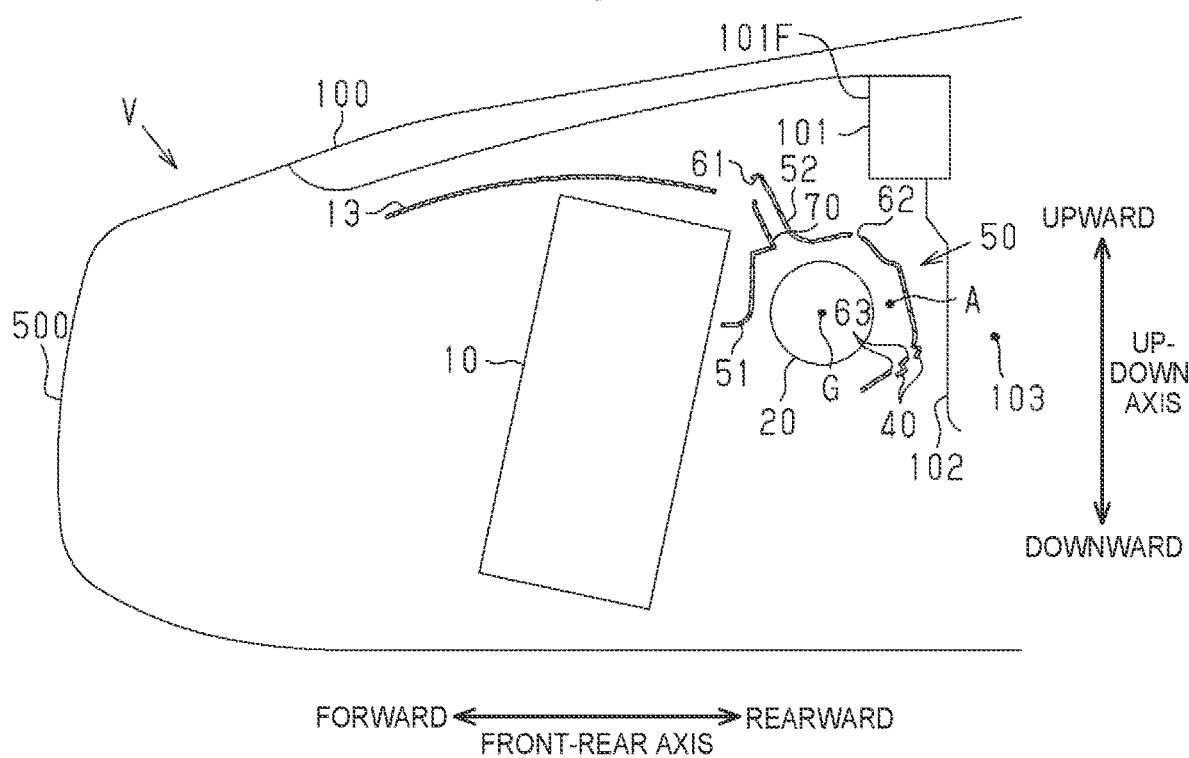
FIG. 1 is a schematic configuration diagram of a vehicle.

As illustrated in FIG. 1, the vehicle V includes a bonnet 100, a cowl 101, and a dash panel 102. The shape of the bonnet 100 is a generally plate shape. The bonnet 100 extends generally along the front-rear axis of the vehicle V. The cowl 101 is connected to a rear edge of the bonnet 100. The shape of the cowl 101 is a tubular shape, for example. The cowl 101 extends generally along the right-left axis of the vehicle V. The dash panel 102 is connected to a bottom end of the cowl 101. The shape of the dash panel 102 is a generally plate shape. The dash panel 102 extends generally along the up-down axis of the vehicle V.

The bonnet 100 and the dash panel 102 define the engine room 500. The bonnet 100 constitutes an upper wall of the engine room 500. The dash panel 102 constitutes a rear wall of the engine room 500. That is, the dash panel 102 separates the engine room 500 from a vehicle cabin 103 in which an occupant of the vehicle V rides.

The vehicle V includes an internal combustion engine 10, a supercharger 20, a cover 13, and an insulator 50.

The internal combustion engine 10 is positioned inside the engine room 500. The internal combustion engine 10 is a drive source for the vehicle V. Although not illustrated herein, the internal combustion engine 10 includes a crankshaft as an output shaft. The crankshaft of the internal combustion engine 10 extends along the right-left axis of the vehicle V. That is, the internal combustion engine 10 is an internal combustion engine for so-called horizontal storage. Note that, in FIG. 1, the shape of the internal combustion engine 10 is simplified.

The cover 13 is positioned inside the engine room 500. The cover 13 is positioned above the internal combustion engine 10. The shape of the cover 13 is a generally plate shape. The cover 13 extends along the front-rear axis of the vehicle V. The cover 13 covers the whole internal combustion engine 10 from its upper side.

The supercharger 20 is connected to the internal combustion engine 10. Although not illustrated herein, the supercharger 20 is connected to the internal combustion engine 10 over an intake passage and an exhaust passage of the internal combustion engine 10. The supercharger 20 includes a turbine wheel configured to rotate by a discharged gas, a compressor wheel configured to compress intake air, and a shaft via which the turbine wheel is connected to the compressor wheel. The supercharger 20 is positioned behind the internal combustion engine 10. Further, the shaft of the supercharger 20 extends along the right-left axis of the vehicle V. Note that, in each drawing, the shape of the supercharger 20 is simplified. Further, in the following description, when the vehicle V is viewed from a direction along the right-left axis, the position of the shaft of the supercharger 20 is taken as a center G of the supercharger 20.

The insulator 50 is connected to the internal combustion engine 10. Although not illustrated herein, the insulator 50 is supported by a fitting or the like extending from the internal combustion engine 10. The insulator 50 covers the supercharger 20 from its front side, its upper side, its rear side, and its lower side.

Configuration of Heat Shield Structure

The following describes a heat shield structure for the supercharger 20.

The insulator 50 includes a first insulator 51 and a second insulator 52. Note that the heat shield structure is constituted by the first insulator 51, the second insulator 52, the supercharger 20, and the cowl 101.

Figure 2:
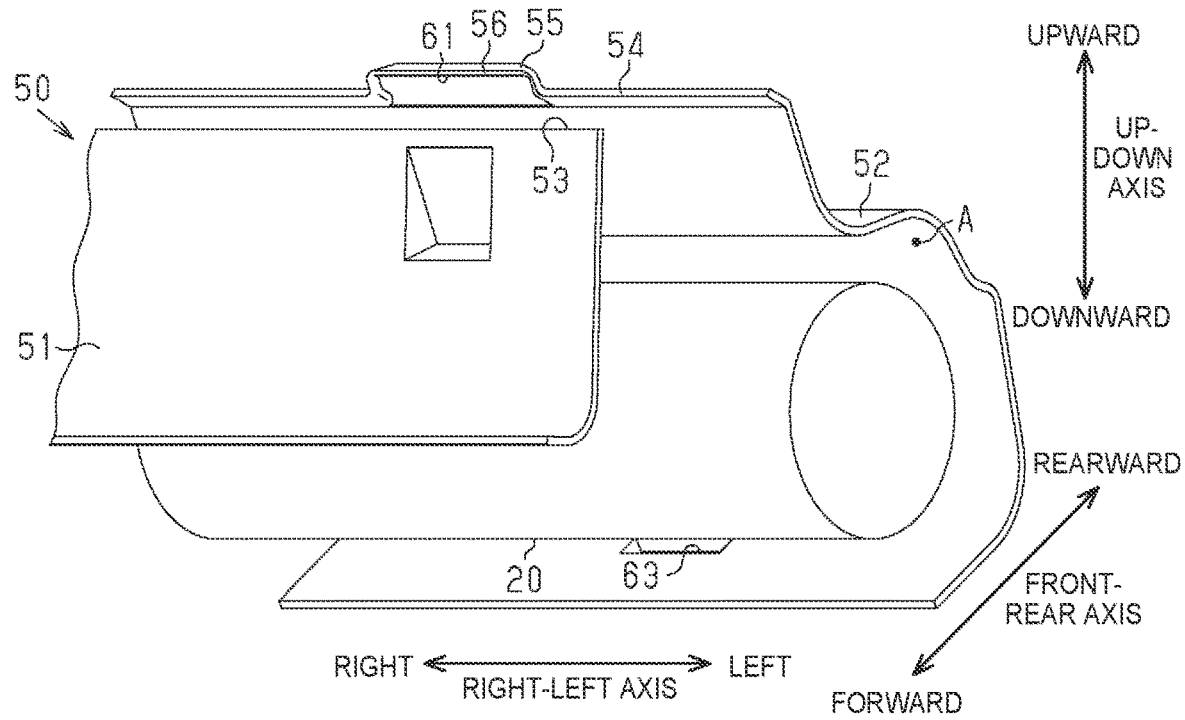
FIG. 2 is an enlarged perspective view of a first insulator and a second insulator.

As illustrated in FIG. 2, the first insulator 51 is made of a rectangular plate material as a whole. A principal surface of the first insulator 51 is perpendicular to the front-rear axis of the vehicle V. A long side of the first insulator 51 is along the right-left axis of the vehicle V. Further, a short side of the first insulator 51 is along the up-down axis of the vehicle V. As illustrated in FIG. 1, the first insulator 51 is positioned between the internal combustion engine 10 and the supercharger 20 in a direction along the front-rear axis of the vehicle V. That is, the first insulator 51 is positioned ahead of the center G of the supercharger 20 so as to cover the supercharger from its front side. Further, an upper end of the first insulator 51 is positioned above the center G of the supercharger 20.

As illustrated in FIG. 2, the second insulator 52 is made of an arcuate plate material projecting rearward in the front-rear direction of the vehicle V as a whole. More specifically, the second insulator 52 curves such that an upper edge and a lower edge of the second insulator 52 are positioned on the front side, and the center of the second insulator 52 is positioned on the rear side. The inner side of the curve of the second insulator 52 faces forward in the front-rear direction of the vehicle V. The second insulator 52 faces the first insulator 51. That is, the whole insulator 50 including the first insulator 51 and the second insulator 52 has a generally tubular shape. The second insulator 52 covers the upper side, the rear side, and the lower side of the supercharger 20. Accordingly, the supercharger 20 is positioned inside an inner region A defined by the first insulator 51 and the second insulator 52.

As illustrated in FIG. 2, an upper edge 54 of the second insulator 52 extends generally in parallel to an upper edge 53 of the first insulator 51. Further, the upper edge 54 of the second insulator 52 is positioned above the upper edge 53 of the first insulator 51.

The second insulator 52 includes a curved portion 55. The curved portion 55 includes part of the upper edge 54 of the second insulator 52. The curved portion 55 projects generally upward. The curved portion 55 is positioned generally in the center of the second insulator 52 in the direction along the right-left axis of the vehicle V. As described above, since the curved portion 55 includes the upper edge 54 of the second insulator 52, a distance from the upper edge 53 of the first insulator 51 to an upper edge 56 of the curved portion 55 is larger than distances from the upper edge 53 to other parts in the upper edge 54 of the second insulator 52. Hereby, a first opening 61 is defined by the upper edge 56 and the upper edge 53.

As illustrated in FIG. 1, the second insulator 52 has a second opening 62. The second opening 62 is positioned behind the first opening 61. Further, the second opening 62 is positioned above the supercharger 20. Here, when a surface facing forward in the front-rear direction of the vehicle V among wall portions of the cowl 101 is taken as a front wall 101F, the front wall 101F extends along the up-down axis of the vehicle V. The second opening 62 is positioned right under the front wall 101F.

Figure 3:
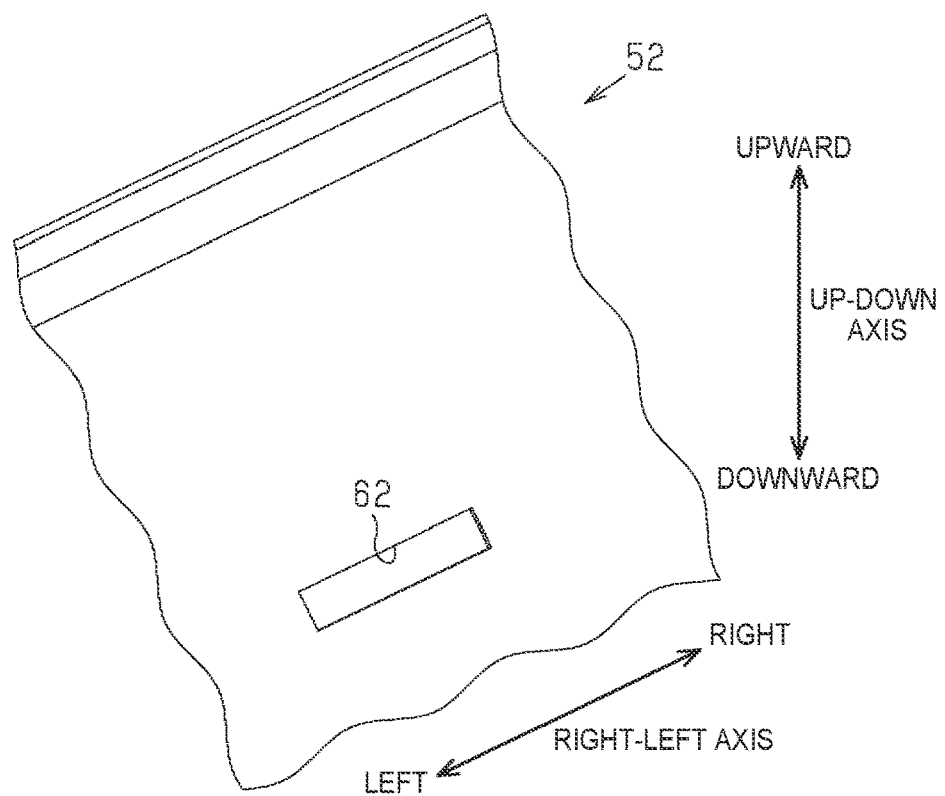
FIG. 3 is an enlarged view near a second opening in the second insulator.

As illustrated in FIG. 3, the shape of the second opening 62 is a rectangular shape elongated in the direction along the right-left axis of the vehicle V. The second opening 62 is positioned generally in the center of the second insulator 52 in the direction along the right-left axis of the vehicle V. The second opening 62 faces upward when the second opening 62 is viewed from the inner region A inside the first insulator 51 and the second insulator 52. Here, that "the second opening 62 faces upward" is not limited to a case where the orientation of the second opening 62 is a directly upper side and includes a case where the orientation of the second opening 62 includes an upper directional component.

Figure 4:
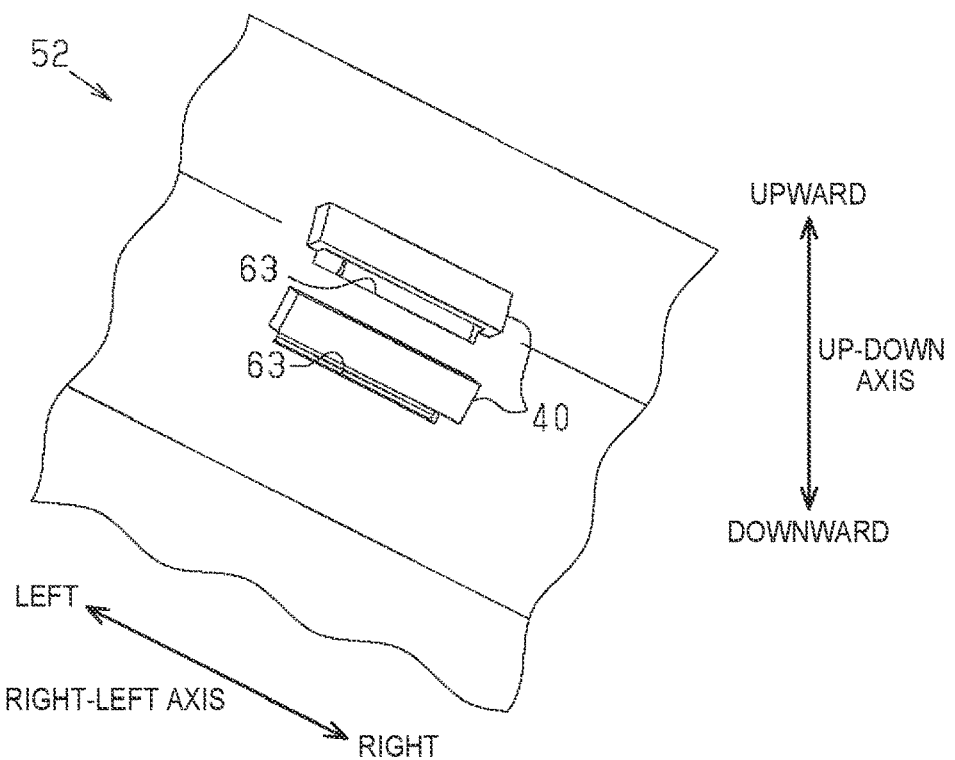
FIG. 4 is an enlarged view near a third opening in the second insulator.

As illustrated in FIG. 4, the second insulator 52 includes two third openings 63. As illustrated in FIG. 1, the two third openings 63 are positioned behind and below the center G of the supercharger 20. The two third openings 63 are arranged in the direction along the up-down axis of the vehicle V. Further, the two third openings 63 are positioned below a rearmost end of the second insulator 52.

As illustrated in FIG. 4, the shape of the third openings 63 is a rectangular shape elongated in the direction along the right-left axis of the vehicle V. The third openings 63 are positioned generally in the center of the second insulator 52 in the direction along the right-left axis of the vehicle V. The third openings 63 face downward when the third openings 63 are viewed from the inner region A inside the first insulator 51 and the second insulator 52. Here, that "the third openings 63 face downward" is not limited to a case where the orientation of the third openings 63 is a directly lower side and includes a case where the orientation of the third openings 63 includes a lower directional component.

The second insulator 52 includes two flow adjusting plates 40. The flow adjusting plates 40 partially cover the third openings 63, respectively. More specifically, each of the flow adjusting plates 40 includes side walls standing up from a surface of the second insulator 52, the surface being opposite to the inner region A. The side walls extend such that the side walls surround an upper edge, half of a left edge, and half of a right edge among edges of its corresponding third opening 63. A main face plate perpendicular to the side walls are connected to distal ends of the side walls. As a result, the flow adjusting plates 40 cover generally half of the upper side of the third openings 63 from outside of the inner region A.

Figure 5:
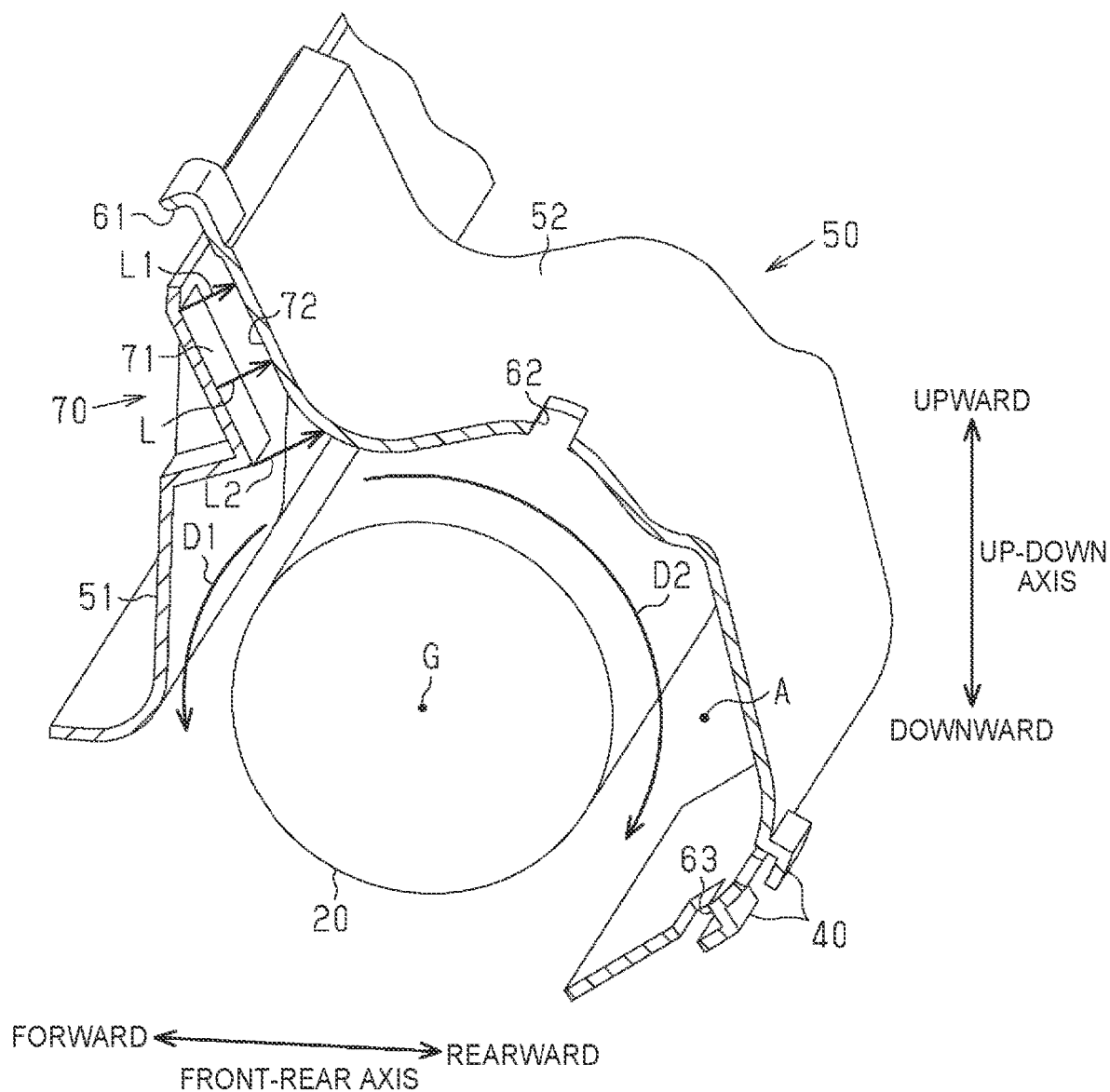
FIG. 5 is an enlarged view illustrating an inner region inside the first insulator and the second insulator.

As illustrated in FIG. 5, the first insulator 51 includes a projection portion 70. The projection portion 70 is provided in the first insulator 51 positioned above and ahead of the center G of the supercharger 20. Further, the projection portion 70 is positioned right under the first opening 61. The projection portion 70 projects toward the supercharger 20. That is, the projection portion 70 projects rearward in the front-rear direction of the vehicle V. When the projection portion 70 is viewed from the direction along the right-left axis, the projection portion 70 projects in a bell-shape from a principal surface of the first insulator 51. Among outer surfaces of the projection portion 70, a surface facing upward and a surface facing downward are both flat surfaces.

Hereby, when the surface facing upward among the outer surfaces of the projection portion 70 is taken as a first surface 71, the second insulator 52 includes a second surface 72 facing the first surface 71 of the first insulator 51. A part of the upper side of the second surface 72 of the second insulator 52 extends in parallel to the first surface 71. However, a distance between the first surface 71 and a part of the lower side of the second surface 72 increases toward the lower side.

As illustrated in FIG. 5, a distance from the first surface 71 to the second surface 72 in a direction perpendicular to the first surface 71 is taken as a distance L. At this time, the distance L in a part where the first surface 71 is parallel to the second surface 72 is a shortest distance L1. Further, the distance L from a lower ledge of the first surface 71 to a lower ledge of the second surface is a longest distance L2. The longest distance L2 is equal to or less than 1.2 times of the shortest distance L1. That is, a difference between the shortest distance L1 and the longest distance L2 is equal to or less than 20% of the shortest distance L1.

Operation

Inside the engine room 500, travel wind flows rearward from the front side in the front-rear direction of the vehicle V during traveling or the like of the vehicle V. The travel wind partially passes above the cover 13. The travel wind passes through the first opening 61 and then flows into the inner region A inside the first insulator 51 and the second insulator 52.

Further, in the travel wind flowing through the engine room 500, travel wind that does not flow into the first opening 61 flows further rearward in the front-rear direction of the vehicle V along an upper surface of the second insulator 52. In this case, part of the travel wind hits the cowl 101 positioned in a rear end of the engine room 500. The travel wind hitting the cowl 101 changes its flow direction to the lower side. The travel wind hitting the cowl 101 and flowing downward partially flows into the inner region A inside the first insulator 51 and the second insulator 52 through the second opening 62.

Further, travel wind that does not passes through the second opening 62 flows through a space between the second insulator 52 and the dash panel 102. Since the second insulator 52 curves to project rearward, a distance between the second insulator 52 and the dash panel 102 is shortest at a rear end of the second insulator 52. The flow rate of the travel wind is higher on the downstream side in a flow direction of the travel wind from the rear end of the second insulator 52.

Now, the travel wind flowing into the inner region A inside the first insulator 51 and the second insulator 52 is guided to an area around the supercharger 20 along the first surface 71 and the second surface 72 of the projection portion 70. Here, as illustrated in FIG. 5, the travel wind flows by being divided roughly to a passage D1 passing through a part between the first insulator 51 and a front part of the supercharger 20 and to a passage D2 passing through a part between the second insulator 52 and each of an upper part, a rear part, and a lower part of the supercharger 20. As described above, the projection portion 70 projects rearward in the front-rear direction of the vehicle V. Accordingly, the travel wind is easily guided to rearward in the front-rear direction of the vehicle V along the projection of the projection portion 70. That is, the travel wind flowing into the inner region A inside the first insulator 51 and the second insulator 52 easily flows into the passage D2.

The travel wind passing through the passage D2 goes out of the inner region A from a lower edge of the second insulator 52. Further, the third openings 63 are present in the second insulator 52 in the middle of the passage D2. The two third openings 63 are positioned below the rearmost end of the second insulator 52. That is, the third openings 63 are provided so as to correspond to a part where the flow rate of the travel wind is high outside the second insulator 52.

Effects (1) In the above embodiment, the first opening 61 faces forward when the first opening 61 is viewed from the inner region A surrounded by the first insulator 51 and the second insulator 52. On that account, the travel wind passing above the cover 13 and flowing rearward in the front-rear direction of the vehicle V easily passes through the first opening 61. Accordingly, much travel wind can be guided to the supercharger 20, so that the supercharger 20 can be cooled effectively.

(2) In the above embodiment, the second insulator 52 has the second opening 62 at a position behind the first opening 61 and above the supercharger 20. Further, the second opening 62 faces upward when the second opening 62 is viewed from the inner region A inside the first insulator 51 and the second insulator 52. Since the second opening 62 faces upward, the travel wind flowing along the upper surface of the second insulator 52 without passing through the first opening 61 can be easily introduced into the inner region A through the second opening 62.

(3) In the above embodiment, the travel wind flowing rearward from the front side of the engine room 500 partially hits the front wall 101F of the cowl 101, so that its flow direction is changed to the lower side. Since the second opening 62 is positioned right under the front wall 101F of the cowl 101, the travel wind thus hitting the front wall 101F easily flows into the inner region A through the second opening 62.

(4) In the above embodiment, the second insulator 52 has the third openings 63 at a position behind and below the supercharger 20. The travel wind flowing through the passage D2 passes through the third openings 63, and then, the travel wind is discharged from the inner region A inside the first insulator 51 and the second insulator 52. This accordingly restrains the travel wind flowing through the inner region A inside the insulator 50 from staying therein and contributes to effective cooling of the supercharger 20.

(5) In the above embodiment, the third openings 63 are positioned below the rearmost end of the second insulator 52. As has been already described, the flow rate of the travel wind is relatively high on the downstream side in the flow direction of the travel wind from the rearmost end of the second insulator 52, that is, below the rearmost end of the second insulator 52. As a result, static pressure is lower in the outside of the insulator 50 than inside the inner region A inside the insulator 50. Due to such a pressure relationship, the travel wind inside the inner region A is easily discharged outside through the third openings 63.

(6) In the above embodiment, the first insulator 51 includes the projection portion 70. The projection portion 70 projects toward the supercharger 20. Accordingly, the travel wind introduced through the first opening 61 is guided to the supercharger 20 by the projection portion 70. On that account, the supercharger 20 is easily cooled by the travel wind.

(7) In the above embodiment, the difference between the shortest distance L1 and the longest distance L2 from the first surface 71 to the second surface 72 in the direction perpendicular to the first surface 71 of the projection portion 70 is equal to or less than 20% of the shortest distance L1. That is, the distance from the first surface 71 to the second surface 72 does not suddenly change in the flow direction of the travel wind. Accordingly, the flow of the travel wind passing through the first opening 61 and flowing into the inner region A inside the insulator 50 is stable. That is, it is possible to restrain occurrence of turbulence around the first opening 61 and to restrain such a situation that the travel wind is hard to flow into the inner region A inside the insulator 50. Further, an increase in the flow rate of the travel wind flowing into the inner region A through the first opening 61 can be expected.

(8) In the above embodiment, the first opening 61 is defined by an edge of the first insulator 51 and an edge of the second insulator 52. Accordingly, it is not necessary to form the first opening 61 by drilling and to restrain an increase in manufacture man-hours.

The present embodiment can also be carried out by adding changes as stated below. The present embodiment and the following modifications can be carried out in combination as long as they do not cause any technical inconsistencies.

In the above embodiment, the configuration inside the vehicle V is not limited to the example in the above embodiment. For example, the cover 13 may not be provided.

In the above embodiment, the cowl 101 may have any shape, provided that the cowl 101 includes a wall portion facing forward. Further, the front wall 101F of the cowl 101 may not extend along the up-down axis. For example, the front wall 101F may extend diagonally downward and rearward when the front wall 101F is viewed from a connecting position between the cowl 101 and the bonnet 100. In this case, the second opening 62 may be positioned right under any part of the front wall 101F.

The wall portion present right above the second opening 62 is not limited to the wall portion of the cowl 101. When a wall portion facing forward is present right above the second opening 62, an effect similarly to (3) can be expected.

In the above embodiment, the configuration of the insulator 50 is not limited to the example in the above embodiment. For example, the insulator 50 may not be divided to the first insulator 51 and the second insulator 52. In this case, the first opening 61 should be formed in the insulator 50 by drilling or the like.

In the above embodiment, the number of the first openings 61 is not limited. That is, two or more first openings 61 may be provided.

In the above embodiment, two or more second openings 62 may be provided. Further, the arrangement of the second opening 62 in the second insulator 52 may be different from the arrangement in the example of the above embodiment. That is, the position of the second opening 62 may not be right under the front wall 101F of the cowl 101. When the second opening 62 is positioned behind the first opening 61, the travel wind flowing along the second insulator 52 partially flows into the inner region A through the second opening 62. Further, the second opening 62 may not be provided.

In the above embodiment, one third opening 63 may be provided, or three or more third openings 63 may be provided. Further, the arrangement of the third opening 63 in the second insulator 52 may be different from the arrangement in the example of the above embodiment, provided that the third opening 63 is positioned behind the first opening 61 and the second opening 62. Further, the third opening 63 may not be provided.

In the above embodiment, the shape of the projection portion 70 is not limited to the example in the above embodiment. For example, the projection portion 70 may be a projection having a hemispheric shape. In this case, a surface, of the projection portion 70, that is observable when the first insulator 51 provided in the vehicle V is viewed from above is taken as the first surface 71.

In the above embodiment, the position of the projection portion 70 is not limited to the example in the above embodiment. For example, in the first insulator 51, the projection portion 70 may not be provided right under the first opening 61. For example, in a case where the first insulator 51 extends diagonally rearward in the front-rear direction of the vehicle V, the first insulator 51 may be positioned behind the first opening 61. Further, the projection portion 70 may not be provided in the insulator 50.

In the above embodiment, the difference between the shortest distance L1 and the longest distance L2 from the first surface 71 to the second surface 72 in the direction perpendicular to the first surface 71 may be larger than 20% of the shortest distance L1. Even in a case where the difference between the shortest distance L1 and the longest distance L2 is large, when the rate of change in distance does not change suddenly, it is possible to restrain occurrence of turbulence near the first opening 61.

In the above embodiment, a flow adjusting plate having a configuration similar to that of the flow adjusting plate 40 may be attached to an opening edge of the second opening 62. With the use of such a flow adjusting plate, the orientation of the travel wind flowing into the inner region A through the second opening 62 can be adjusted. In this case, it is preferable that an opening surrounded by an edge of the flow adjusting plate and an outer surface of the second insulator 52 face forward or rearward when the opening is viewed from the inner region A. With such a configuration, the flow adjusting plate can hardly disturb the flow of the travel wind to flow into the second opening 62.

In the above embodiment, the flow adjusting plates 40 along opening edges of the third openings 63 may not be provided. For example, the flow adjusting plates 40 may be omitted, provided that the orientation of the third openings 63 viewed from the inner region A is the same as the orientation to which the travel wind is desired to be discharged.

What is claimed is:

1. A heat shield structure for a supercharger, the heat shield structure being applied to a vehicle including an internal combustion engine, a supercharger arranged behind the internal combustion engine in a front-rear direction of the vehicle, and an insulator covering the supercharger, wherein:

the insulator is provided between the internal combustion engine and the supercharger in the front-rear direction such that the insulator covers the supercharger from a front side of the supercharger, the front side of the supercharger facing towards the internal combustion engine in the front-rear direction of the vehicle, and the insulator also covers the supercharger from an upper side, a rear side in the front-rear direction, and a lower side of the supercharger;

the insulator has an opening at a position above the supercharger and ahead of the supercharger in the front-rear direction;

the opening faces forward in the front-rear direction of the vehicle;

the insulator includes a first insulator covering the front side of the supercharger, and a second insulator covering the upper side, the rear side, and the lower side of the supercharger;

the opening is defined by an edge of the first insulator and an edge of the second insulator;

the first insulator is provided between the internal combustion engine and the supercharger in the front-rear direction and an upper edge of the second insulator is positioned above an upper edge of the first insulator; and the first insulator and the second insulator are different members.

2. The heat shield structure according to claim 1, wherein:

when the opening is taken as a first opening, the insulator has a second opening at a position behind the first opening in the front-rear direction of the vehicle and above the supercharger, and the second opening faces upward.

3. The heat shield structure according to claim 2, comprising a wall portion above the insulator, wherein:

the wall portion faces forward; and the second opening is positioned under the wall portion.

4. The heat shield structure according to claim 1, wherein:

when the opening is taken as a first opening, the insulator has a third opening at a position behind the supercharger in the front-rear direction of the vehicle, and below the supercharger; and the third opening faces downward.

5. The heat shield structure according to claim 1, wherein:

the insulator includes a projection portion projecting toward the supercharger; and the projection portion is positioned below the opening and ahead of the supercharger in the front-rear direction of the vehicle.

6. The heat shield structure according to claim 5, wherein:

when a surface facing upward among surfaces of the projection portion is taken as a first surface, the insulator includes a second surface facing the first surface; and a difference between a shortest distance and a longest distance from the first surface to the second surface in a direction perpendicular to the first surface is equal to or less than 20% of the shortest distance.

7. A vehicle comprising:

an engine compartment;

an internal combustion engine disposed inside the engine compartment;

a supercharger disposed inside the engine compartment and behind the internal combustion engine in a front-rear direction of the vehicle; and an insulator that is disposed inside the engine compartment, and includes a portion that is between the internal combustion engine and the supercharger in the front-rear direction of the vehicle, wherein the insulator also covers the supercharger from an upper side, a rear side in the front-rear direction of the vehicle, and a lower side of the supercharger, the insulator has an opening at a position above the supercharger and ahead of the supercharger in the front-rear direction, the opening faces forward in the front-rear direction of the vehicle, the insulator includes a first insulator covering the front side of the supercharger, and a second insulator covering the upper side, the rear side, and the lower side of the supercharger, the opening is defined by an edge of the first insulator and an edge of the second insulator, the first insulator is provided between the internal combustion engine and the supercharger in the front-rear direction and an upper edge of the second insulator is positioned above an upper edge of the first insulator, and the first insulator and the second insulator are different members.

* * * * *